US 006984723B2

United States Patent
Käser

(10) Patent No.: US 6,984,723 B2
(45) Date of Patent: Jan. 10, 2006

(54) USE OF COPPER COMPLEXES OF DISAZO DYES FOR DYEING NATURAL AND SYNTHETIC MATERIAL

(75) Inventor: Adolf Käser, Bottmingen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 301 days.

(21) Appl. No.: 10/451,834

(22) PCT Filed: Dec. 19, 2001

(86) PCT No.: PCT/EP01/15010

§ 371 (c)(1),
(2), (4) Date: Jun. 25, 2003

(87) PCT Pub. No.: WO02/053650

PCT Pub. Date: Jul. 11, 2002

(65) Prior Publication Data

US 2004/0054153 A1    Mar. 18, 2004

(30) Foreign Application Priority Data

Dec. 28, 2000  (EP) .................... 00811255

(51) Int. Cl.
*C09B 45/28*  (2006.01)
*C09B 67/22*  (2006.01)
*D06P 1/10*  (2006.01)
*D21H 21/28*  (2006.01)

(52) U.S. Cl. ............... 534/569; 534/701; 534/718; 534/719; 8/527; 8/641; 8/681; 8/685; 8/919

(58) Field of Classification Search ............. 534/569, 534/701, 718, 719; 8/527, 641, 681, 685, 8/919

See application file for complete search history.

(56) References Cited

U.S. PATENT DOCUMENTS

| | | | |
|---|---|---|---|
| 2,620,331 A | 12/1952 | Wehrli | 260/148 |
| 2,927,917 A | 3/1960 | Dürig et al. | 260/148 |
| 3,399,187 A | 8/1968 | Dürig et al. | 260/148 |
| 3,894,836 A | 7/1975 | Frei | 8/7 |
| 4,514,188 A | 4/1985 | Michna et al. | 8/641 |

FOREIGN PATENT DOCUMENTS

| | | |
|---|---|---|
| DE | 2138791 | 2/1972 |
| FR | 1161475 | 9/1958 |
| GB | 352956 | 7/1931 |
| WO | 00/55259 | 9/2000 |

*Primary Examiner*—Fiona T. Powers
(74) *Attorney, Agent, or Firm*—Kevin T. Mansfield

(57) ABSTRACT

Use of the mono-copper complex of a dye of formula (1) wherein $Z_1$, $Z_2$, $R_1$, $R_2$, $R_3$, $R_4$, X, n and m are as defined in the claims, and mixtures thereof with the bis-copper complex of such a dye, for dyeing natural and synthetic material.

13 Claims, No Drawings

USE OF COPPER COMPLEXES OF DISAZO DYES FOR DYEING NATURAL AND SYNTHETIC MATERIAL

The present invention relates to the use of the mono-copper complex of a dye of formula

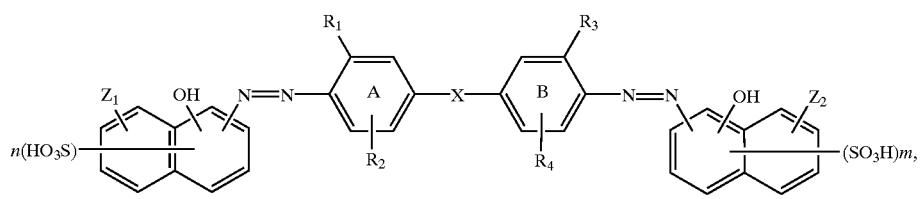

(1)

wherein $Z_1$ and $Z_2$ are each independently of the other hydrogen, hydroxy, alkoxy or a radical —$NHR_5$, $R_5$ being hydrogen, alkyl, aryl, —$COR_6$, —CO—$NHR_6$, —$SO_2R_6$ or —$COOR_6$, $R_6$ being hydrogen, alkyl or aryl, $R_1$ and $R_3$ are each independently of the other hydroxy or alkoxy, or one of these radicals may also be alkyl, $R_2$ and $R_4$ are each independently of the other hydrogen, hydroxy, alkyl or alkoxy, halogen, sulfo, carboxy, —$NHCONHR_6$ or —$NHCOR_6$, X is a bridging member but not a direct bond, n and m are each independently of the other 1 or 2, the OH groups in the naphthyl radicals being in the o-position to the azo groups, and wherein the rings A and B may each independently of the other carry a fused-on benzene ring, and to the use of mixtures of such a mono-copper complex with the bis-copper complex of such a dye, for dyeing natural and synthetic material, the mixtures containing up to 50% by weight of the bis-copper complex.

In the dyes of formula (1) X is preferably a bridging member selected from the group azo, azoxy, —C═C—, —$NR_7$—, —$NR_7$CO—$NR_7$— and a group of formula

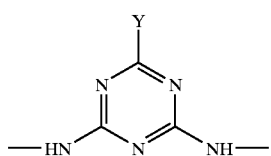

wherein Y is OH, $C_1$–$C_4$alkoxy or —$NR_7R_8$, $R_7$ and $R_8$ being each independently of the other hydrogen, unsubstituted or substituted alkyl or unsubstituted or substituted aryl.

In this Application, halogen is generally fluorine, bromine or, especially chlorine.

According to the invention, alkyl radicals are to be understood as being generally open-chain or branched or cyclic alkyl radicals, preferably containing from 1 to 8 carbon atoms, for example methyl, ethyl, n- or iso-propyl, n-, sec- or tert-butyl, n-hexyl, n-octyl, cyclopentyl and cyclohexyl.

Aryl is to be understood as being especially naphthyl or phenyl, especially unsubstituted naphthyl or phenyl.

These alkyl radicals and also the cycloalkyl or aryl groups may be mono- or poly-substituted, for example by hydroxy, carboxy, halogen, cyano, amino or $C_1$–$C_4$alkoxy.

The alkoxy radicals may have from 1 to 12 carbon atoms, preferably from 1 to 4 carbon atoms, and are, for example, methoxy, ethoxy, propoxy, isopropoxy, n-butoxy, isobutoxy, tert-butoxy, n-pentyloxy and n-hexyloxy. The alkoxy groups also may be substituted, for example by the radicals listed as possible substituents for the alkyl groups, especially by hydroxy or $C_1$–$C_4$alkoxy.

In the dyes of formula (1) and in the copper complexes, $Z_1$ and $Z_2$ are preferably hydrogen, hydroxy, alkoxy, amino, or anilino which is unsubstituted or substituted by amino and/or by sulfo.

$R_2$ and $R_4$ are preferably hydrogen, $C_1$–$C_4$alkyl or $C_1$–$C_4$alkoxy.

In this Application, the dyes are shown in the form of the free acid, but the corresponding salts, for example metal or ammonium salts, e.g. alkyl- or hydroxyalkyl-ammonium salts, are also to be included.

In the mixtures of mono- and bis-copper complexes, the dyes on which the complexes are based are preferably identical.

Preferred mixtures contain from 1 to 35% by weight, preferably from 5 to 25% by weight, of the bis-copper complex.

The mono-copper complexes and mixtures thereof with the bis-copper complexes are obtained, in a manner known per se, by means of copper-treatment of the customarily prepared dyes of formula (1) with copper-yielding agents in amounts of from 1 to 1.5 moles of copper per mole of dye of formula (1). The copper-treatment can also be carried out by demethylation as a result of cleavage of an alkoxy group or oxidatively with introduction of an additional oxygen group.

Depending upon the nature of the bridging member X, it is also possible for one of the halves of the dye of formula (1) that are connected by X to be reacted with up to 1 mole of copper-yielding agent and then to be connected to the second, non-copper-treated half via the bridging member X. It is preferred, however, to start from the dye of formula (1) and to react that dye with a copper-yielding agent.

The natural and synthetic material that can be dyed using the mono-copper complex or using mixtures of the mono-copper complex with the bis-copper complex is, for example, fibre material of leather, wool, polyamide, glass fibres or cotton and, especially, paper.

Using customary dyeing methods, blue dyeings having good fastness properties, especially good light-fastness properties, are obtained on such materials. The shade and the light-fastness can be controlled by the amount of copper used. The amount of free copper in the effluents from synthesis can be reduced to a value of under 100 ppm whilst still obtaining good light-fastness properties.

The dyes of formula (1) and also the use of bis-copper complexes thereof for improving light-fastness when dyeing cellulose material are already known. In the customary synthesis of the bis-copper complexes, however, the effluent contains significant amounts of copper, which can only be removed by complicated means.

The mono-copper complexes or mixtures thereof with the bis-copper complex are preferably used as solid or liquid commercial forms.

In the form of powder or granules, the dye mixtures are used especially in discontinuous mass dyeing, the dye mixture being added usually in the form of a stock solution to the pulper, hollander or mixing vat. In this case dye preparations are preferably used which may also comprise, besides the dye mixture, diluents, e.g. urea as solubiliser, dextrin, Glauber's salt, sodium chloride and dispersants, dusting agents and sequestrants, such as tetrasodium phosphate.

The invention accordingly relates also to solid dye preparations for dyeing paper, which preparations comprise a mono-copper complex used in accordance with the invention or a mixture thereof with the corresponding bis-copper complex and further additives.

In recent years, the use of concentrated aqueous solutions of dyes has gained in importance, specifically because of the advantages which such solutions have over dyes in powder form. By using solutions, the difficulties associated with the formation of dust are avoided and the users are freed from the time-consuming and often difficult dissolution of the dye powder in water. The use of concentrated solutions has been prompted furthermore by the development of continuous dyeing processes for paper, since in those processes it is advantageous to add the solution in metered amounts directly to the pulp flow or at any other suitable point in the paper-making.

The invention accordingly relates also to concentrated aqueous solutions of the mono-copper complex used in accordance with the invention or of mixtures thereof with the bis-copper complex for dyeing paper, which solutions contain from 5 to 30% by weight of copper complex, based on the total weight of the solution.

The concentrated solutions may comprise further auxiliaries, for example solubilisers, such as ε-caprolactam or urea, organic solvents, such as glycols, polyethylene glycols, dimethyl sulphoxide, N-methylpyrrolidone, acetamide, alkanolamines or polyglycolamines.

The following Examples serve to illustrate the invention but do not limit the invention thereto. Parts and percentages relate to weight, unless otherwise defined.

EXAMPLE 1

18.4 parts (0.02 moles) of the dye of formula

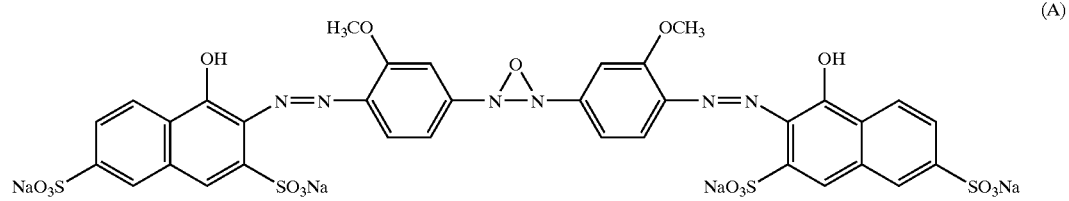

(A)

are dissolved in 170 parts of water and 7 parts of 25% ammonium hydroxide and stirred with 5 parts (0.02 moles) of copper sulfate pentahydrate at 100° C. until the reaction is complete. After a reaction time of 5 hours, analytical testing for free copper by means of polarography shows a value of <20 ppm. The reaction solution comprises the dye of formula

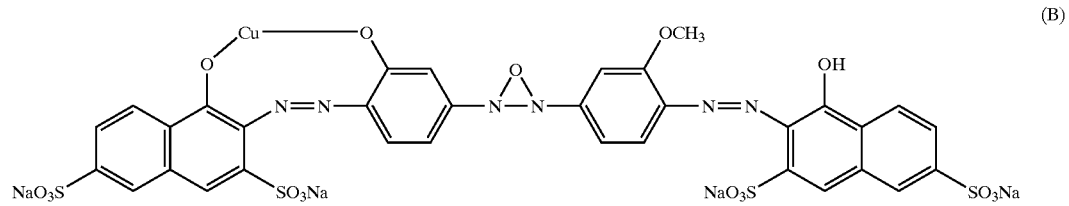

(B)

in admixture with the corresponding twice-coppered dye (Direct Blue 290). The reaction mixture obtained dyes cellulose fibres, and especially paper, brilliant reddish-blue shades having good fastness properties and with a high degree of exhaustion. The light-fastness of the dyeing on paper is almost equally as good as a corresponding dyeing using Direct Blue 290 alone.

The crude reaction solution can be further processed into a liquid formulation directly, without intermediate isolation. The customary methods described in the literature, especially membrane technology, can be used for the purpose, optionally using salt forms other than the sodium salt described hereinbefore and with addition of customary hydrotropic agents for improving solubility.

Similarly valuable dye mixtures are obtained when 0.03 moles or 0.01 mole of copper sulfate is used instead of 0.02 moles of copper sulfate.

EXAMPLES 2 to 25

Further mixtures comprising novel blue mono-copper complexes analogous to the structure (B) shown in Example 1 are obtained by proceeding as described in Example 1, but using dyes having a structure analogous to the structure (A) shown in Example 1, which are obtained by tetraazotisation of the diamines listed in the second column of the following table and coupling to the coupling component listed in the third column.

| Example | Diamine | Coupling Component |
|---|---|---|
| 2 | 4,4'-diamino-3,3'-dimethoxy-azoxybenzene | 1,8-dihydroxynaphthalene-3,6-disulfonic acid |
| 3 | 4,4'-diamino-3,3'-dimethoxy-azoxybenzene | 1-naphthol-3,6-disulfonic acid |
| 4 | 4,4'-diamino-3,3'-dimethoxy-azoxybenzene | 1-naphthol-3,8-disulfonic acid |
| 5 | 4,4'-diamino-3,3'-dimethoxy-azoxybenzene | 1-naphthol-4,8-disulfonic acid |
| 6 | 4,4'-diamino-3,3'-dimethoxy-azoxybenzene | 2-naphthol-3,6-disulfonic acid |
| 7 | 4,4'-diamino-3,3'-dimethoxy-azoxybenzene | 2-naphthol-5,7-disulfonic acid |
| 8 | 4,4'-diamino-3,3'-dimethoxy-azoxybenzene | 2-naphthol-6,8-disulfonic acid |
| 9 | 4,4'-diamino-3,3'-dimethoxy-azoxybenzene | 1-naphthol-5-sulfonic acid |
| 10 | 4,4'-diamino-3,3'-dimethoxy-azoxybenzene | 2-naphthol-6-sulfonic acid |
| 11 | 4,4'-diamino-3,3'-dimethoxy-azoxybenzene | 1-amino-8-naphthol-3,6-disulfonic acid |
| 12 | 4,4'-diamino-3,3'-dimethoxy-azoxybenzene | 1-amino-8-naphthol-2,4-disulfonic acid |
| 13 | 4,4'-diamino-3,3'-dimethoxy-azoxybenzene | 1-amino-8-naphthol-4,6-disulfonic acid |
| 14 | 4,4'-diamino-3,3'-dimethoxy-azoxybenzene | 2-amino-5-naphthol-1,7-disulfonic acid |
| 15 | 4,4'-diamino-3,3'-dimethoxy-azoxybenzene | 3-amino-5-naphthol-2,7-disulfonic acid |
| 16 | 4,4'-diamino-3,3'-dimethoxy-azoxybenzene | 2-amino-5-naphthol-7-sulfonic acid |
| 17 | 4,4'-diamino-3,3'-dimethoxy-azoxybenzene | 3-amino-5-naphthol-7-sulfonic acid |
| 18 | 4,4'-diamino-3,3'-dimethoxy-azoxybenzene | 2-amino-5-naphthol-4,8-disulfonic acid |
| 19 | 4,4'-diamino-3,3'-dimethoxy-azoxybenzene | 2-(4-amino-3-sulfoanilino)-5-naphthol-7-sulfonic acid |
| 20 | 4,4'-diamino-3,3'-dimethoxy-azoxybenzene | 3-(4-amino-3-sulfoanilino)-5-naphthol-7-sulfonic acid |
| 21 | 4,4'-diamino-3,3'-dimethoxy-azoxybenzene | 1-ethoxycarbonylamino-8-naphthol-3,6-disulfonic acid |
| 22 | 4,4'-diamino-3,3'-dimethoxy-azoxybenzene | 1-p-tolylsulfonylamino-8-naphthol-3,6-disulfonic acid |
| 23 | 4,4'-diamino-3,3'-dimethoxy-azoxybenzene | 1-ureido-8-naphthol-3,6-disulfonic acid |
| 24 | 4,4'-diamino-3,3'-dimethoxy-azoxybenzene | 2-(3-sulfoanilino)-5-naphthol-sulfonic acid |
| 25 | 4,4'-diamino-3,3'-dimethoxy-azoxybenzene | 1-naphthol-3,6-disulfonic acid and 1-ethoxycarbonyl-8-naphthol-3,6-disulfonic acid (1:1) |

EXAMPLES 26 to 69

Further mixtures comprising novel blue mono-copper complexes analogous to the structure (B) shown in Example 1 are obtained by proceeding as described in Example 1, but using dyes having a structure analogous to the structure (A) shown in Example 1, which are obtained by tetraazotisation of the diamines listed in the second column of the following table and coupling to the coupling component listed in the third column.

| | Diamine | Coupling Component |
|---|---|---|
| 26 | 4,4'-diamino-3,3'-dimethoxy-azobenzene | 1-hydroxynaphthalene-3,6-disulfonic acid |
| 27 | 4,4'-diamino-3,3'-dimethoxy-azobenzene | 1,8-dihydroxynaphthalene-3,6-disulfonic acid |
| 28 | 4,4'-diamino-3,3'-dimethoxy-azobenzene | 1-naphthol-3,6-disulfonic acid |
| 29 | 4,4'-diamino-3,3'-dimethoxy-azobenzene | 1-naphthol-3,8-disulfonic acid |
| 30 | 4,4'-diamino-3,3'-dimethoxy-azobenzene | 1-naphthol-4,8-disulfonic acid |
| 31 | 4,4'-diamino-3,3'-dimethoxy-azobenzene | 2-naphthol-3,6-disulfonic acid |
| 32 | 4,4'-diamino-3,3'-dimethoxy-azobenzene | 2-naphthol-5,7-disulfonic acid |
| 33 | 4,4'-diamino-3,3'-dimethoxy-azobenzene | 2-naphthol-6,8-disulfonic acid |
| 34 | 4,4'-diamino-3,3'-dimethoxy-azobenzene | 1-naphthol-5-sulfonic acid |
| 35 | 4,4'-diamino-3,3'-dimethoxy-azobenzene | 2-naphthol-6-sulfonic acid |
| 36 | 4,4'-diamino-3,3'-dimethoxy-azobenzene | 1-amino-8-naphthol-3,6-disulfonic acid |
| 37 | 4,4'-diamino-3,3'-dimethoxy-azobenzene | 1-amino-8-naphthol-2,4-disulfonic acid |
| 38 | 4,4'-diamino-3,3'-dimethoxy-azobenzene | 1-amino-8-naphthol-4,6-disulfonic acid |
| 39 | 4,4'-diamino-3,3'-dimethoxy-azobenzene | 2-amino-5-naphthol-1,7-disulfonic acid |
| 40 | 4,4'-diamino-3,3'-dimethoxy-azobenzene | 3-amino-5-naphthol-2,7-disulfonic acid |
| 41 | 4,4'-diamino-3,3'-dimethoxy-azobenzene | 2-amino-5-naphthol-7-sulfonic acid |
| 42 | 4,4'-diamino-3,3'-dimethoxy-azobenzene | 3-amino-5-naphthol-7-sulfonic acid |
| 43 | 4,4'-diamino-3,3'-dimethoxy-azobenzene | 2-amino-5-naphthol-4,8-disulfonic acid |
| 44 | 4,4'-diamino-3,3'-dimethoxy-azobenzene | 2-(4-amino-3-sulfoanilino)-5-naphthol-7-sulfonic acid |
| 45 | 4,4'-diamino-3,3'-dimethoxy-azobenzene | 3-(4-amino-3-sulfoanilino)-5-naphthol-7-sulfonic acid |
| 46 | 4,4'-diamino-3,3'-dimethoxy-azobenzene | 1-ethoxycarbonylamino-8-naphthol-3,6-disulfonic acid |
| 47 | 4,4'-diamino-3,3'-dimethoxy-azobenzene | 1-p-tolylsulfonylamino-8-naphthol-3,6-disulfonic acid |
| 48 | 4,4'-diamino-3,3'-dimethoxy-azobenzene | 1-ureido-8-naphthol-3,6-disulfonic acid |
| 49 | 4,4'-diamino-3,3'-dimethoxy-azobenzene | 2-(3-sulfoanilino)-5-naphthol-sulfonic acid |
| 50 | 4,4'-diamino-3,3'-dimethoxy-azobenzene | 1-naphthol-3,6-disulfonic acid and 1-ethoxycarbonyl-8-naphthol-3,6-disulfonic acid (1:1) |

-continued

| | | |
|---|---|---|
| 51 | 4,4'-diamino-3,3'-dimethoxy-diphenylurea | 1-hydroxynaphthalene-3,6-disulfonic acid |
| 52 | 4,4'-diamino-3,3'-dimethoxy-diphenylurea | 1,8-dihydroxynaphthalene-3,6-disulfonic acid |
| 53 | 4,4'-diamino-3,3'-dimethoxy-diphenylurea | 1-amino-8-naphthol-3,6-disulfonic acid |
| 54 | 4,4'-diamino-3,3'-dimethoxy-diphenylurea | 2-(4-amino-3-sulfoanilino)-5-naphthol-7-sulfonic acid |
| 55 | 4,4'-diamino-3,3'-dimethoxy-diphenylurea | 1-ethoxycarbonylamino-8-naphthol-3,6-disulfonic acid |
| 56 | 4,4'-diamino-3,3'-dimethoxy-diphenylurea | 1-p-tolylsulfonylamino-8-naphthol-3,6-disulfonic acid |
| 57 | 4,4'-diamino-3,3'-dimethoxy-diphenylurea | 1-ureido-8-naphthol-3,6-disulfonic acid |
| 58 | 1,3-di(3'-methoxy-4'-amino)-2-dihydroxyethylamino-2,4,6-triazine | 1-hydroxynaphthalene-3,6-disulfonic acid |
| 59 | 1,3-di(3'-methoxy-4'-amino)-2-dihydroxyethylamino-2,4,6-triazine | 1,8-dihydroxynaphthalene-3,6-disulfonic acid |
| 60 | 1,3-di(3'-methoxy-4'-amino)-2-dihydroxyethylamino-2,4,6-triazine | 1-amino-8-naphthol-3,6-disulfonic acid |
| 61 | 1,3-di(3'-methoxy-4'-amino)-2-dihydroxyethylamino-2,4,6-triazine | 2-(4-amino-3-sulfoanilino)-5-naphthol-7-sulfonic acid |
| 62 | 1,3-di(3'-methoxy-4'-amino)-2-dihydroxyethylamino-2,4,6-triazine | 1-ethoxycarbonylamino-8-naphthol-3,6-disulfonic acid |
| 63 | 1,3-di(3'-methoxy-4'-amino)-2-dihydroxyethylamino-2,4,6-triazine | 1-p-tolylsulfonylamino-8-naphthol-3,6-disulfonic acid |
| 64 | 1,3-di(3'-methoxy-4'-amino)-2-dihydroxyethylamino-2,4,6-triazine | 1-ureido-8-naphthol-3,6-disulfonic acid |
| 65 | 1,3-di(3'-methoxy-4'-amino)-2-dihydroxyethylamino-2,4,6-triazine | 1,8-dihydroxynaphthalene-3,6-disulfonic acid |
| 66 | 4,4'-diamino-diphenylamine | 1-naphthol-3,6-disulfonic acid |
| 67 | 4,4'-diamino-diphenylamine | 1-amino-8-naphthol-3,6-disulfonic acid |
| 68 | 4,4'-diamino-diphenylamine | 1-benzoylamino-8-naphthol-3,6-disulfonic acid |
| 69 | 4,4'-diamino-diphenylamine | 2-(4-amino-3-sulfoanilino)-5-naphthol-7-sulfonic acid |

What is claimed is:

1. A process for dyeing natural and synthetic material, which comprises dyeing said material with a mono-copper complex of a dye of formula

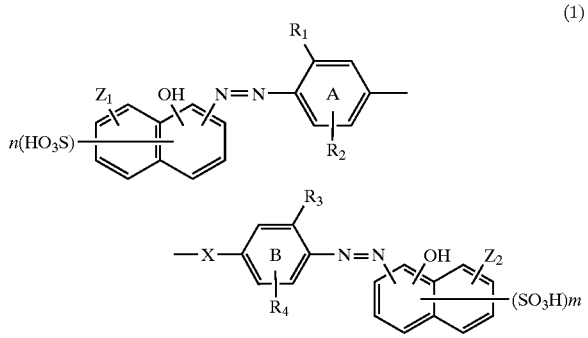

wherein $Z_1$ and $Z_2$ are each independently of the other hydrogen, hydroxy, alkoxy or a radical —$NHR_5$, $R_5$ being hydrogen, alkyl, aryl, —$COR_6$, —CO—$NHR_6$, —$SO_2R_6$ or —$COOR_6$, $R_6$ being hydrogen, alkyl or aryl, $R_1$ and $R_3$ are each independently of the other hydroxy or alkoxy, or one of these radicals may also be alkyl, $R_2$ and $R_4$ are each independently of the other hydrogen, hydroxy, alkyl or alkoxy, halogen, sulfo, carboxy, —$NHCONHR_6$ or —$NHCOR_6$, X is a bridging member but not a direct bond, n and m are each independently of the other 1 or 2, the OH groups in the naphthyl radicals being in the o-position to the azo groups, and wherein the rings A and B may each independently of the other carry a fused-on benzene ring, or a mixture of such a mono-copper complex with the bis-copper complex of such a dye, the mixture containing up to 50% by weight of the bis-copper complex.

2. A process according to claim 1, wherein X is a bridging member selected from the group consisting of azo, azoxy, —C═C—, —$NR_7$—, —$NR_7CO$—$NR_7$— and formula

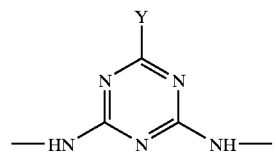

wherein Y is OH, $C_1$–$C_4$alkoxy or —$NR_7R_8$, $R_7$ and $R_8$ being each independently of the other hydrogen, unsubstituted or substituted alkyl or unsubstituted or substituted aryl.

3. A process according to claim 1, wherein $Z_1$ and $Z_2$ are hydrogen, hydroxy, alkoxy, amino, or anilino which is unsubstituted or substituted by amino and/or by sulfo.

4. A process according to claim 1, wherein $R_2$ and $R_4$ are hydrogen, $C_1$–$C_4$alkyl or $C_1$–$C_4$alkoxy.

5. A process according to claim 1, wherein in the mixture of mono- and bis-copper complexes, the dyes on which the complexes are based are identical.

6. A process wherein a mixture according to claim 1, which contains from 1 to 35% by weight of the bis-copper complex is used.

7. A solid dye preparation for dyeing paper, which preparation comprises a mono-copper complex of formula (1) according to claim 1 or a mixture thereof with the corresponding bis-copper complex and further additives.

8. A solid dye preparation according to claim 7, which comprises diluent(s), solubiliser(s), dispersant(s), dusting agent(s) or sequestrant(s) as further additive(s).

9. A concentrated aqueous solution for dyeing paper, which solution comprises a mono-copper complex of formula (1) according to claim 1 or a mixture thereof with the corresponding bis-copper complex and, optionally, further auxiliaries.

10. A concentrated aqueous solution according to claim 9, which comprises solubiliser(s) or organic solvent(s) as auxiliary(ies).

11. Paper dyed using a mono-copper complex of formula (1) according to claim 1 or a mixture thereof with the corresponding bis-copper complex.

12. Paper dyed using a solid dye preparation according to claim 7.

13. Paper dyed using a concentrated aqueous solution according to claim 9.

* * * * *